US012255925B2

(12) United States Patent
Monni et al.

(10) Patent No.: US 12,255,925 B2
(45) Date of Patent: Mar. 18, 2025

(54) SYSTEMS AND METHODS FOR AUTOMATICALLY RENDERING AND DEPLOYING NETWORK SECURITY POLICIES

(71) Applicant: Salesforce, inc., San Francisco, CA (US)

(72) Inventors: Gianstefano Monni, Nuoro (IT); Jose Lejin P J, Bangalore (IN); Megha Dixit, Hyderabad (IN); Prabhat Singh, San Francisco, CA (US); Praveenkumar Sowpati, Bangalore (IN); Darragh Connaughton, Ireland (IE); Dheeraj Kakkar, Bangalore (IN); Aditya Suresh Kumar, Santa Clara, CA (US); Varun Kulkarni Somashekhar, Fremont, CA (US); Vamshi Karnati, San Francisco, CA (US); Arthur Jones, Bend, OR (US); Ashwin Shroff, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 229 days.

(21) Appl. No.: 18/162,403

(22) Filed: Jan. 31, 2023

(65) Prior Publication Data

US 2024/0259429 A1 Aug. 1, 2024

(51) Int. Cl.
*H04L 9/40* (2022.01)
(52) U.S. Cl.
CPC ............ *H04L 63/20* (2013.01); *H04L 63/101* (2013.01)

(58) Field of Classification Search
CPC .... H04L 63/20; H04L 63/101; H04L 63/0263
See application file for complete search history.

(56) References Cited

U.S. PATENT DOCUMENTS

| | | | |
|---|---|---|---|
| 10,812,521 B1* | 10/2020 | Sharifi Mehr | H04L 63/1433 |
| 2006/0282886 A1* | 12/2006 | Gaug | H04L 63/1408 726/5 |
| 2018/0375886 A1* | 12/2018 | Kirti | H04L 67/10 |
| 2021/0351980 A1* | 11/2021 | Huffman | H04L 63/1416 |
| 2022/0053023 A1* | 2/2022 | Althouse | H04L 9/0643 |

\* cited by examiner

*Primary Examiner* — El Hadji M Sall
(74) *Attorney, Agent, or Firm* — Holland & Hart LLP

(57) ABSTRACT

Methods, systems, and devices for data processing in a computing system are described. The computing system may receive a notification of an update to network security objects hosted in diverse substrates within the computing system. The computing system may retrieve a network security policy for a service instance impacted by the update. The computing system may update the network security policy for the service instance according to a network security configuration of the hosting substrate. The computing system may translate the updated network security policy into access control lists (ACLs) for network entities managing communications between service instances within the computing system. The computing system may store the ACLs in respective data repositories that are accessible to the network entities. The computing system may transmit a notification that the ACLs are available for deployment, thereby causing the network entities to retrieve the ACLs from the respective data repositories.

20 Claims, 9 Drawing Sheets

SYSTEMS AND METHODS FOR AUTOMATICALLY RENDERING AND DEPLOYING NETWORK SECURITY POLICIES

FIELD OF TECHNOLOGY

The present disclosure relates generally to database systems and data processing, and more specifically to techniques for automatically rendering and deploying network security policies.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Some cloud computing systems may employ policy-based network security mechanisms to monitor network traffic, detect suspicious activity, block unauthorized communications, etc. In some cases, however, manually creating or updating a network security policy can result in prohibitive time consumption, unacceptable delays, data breaches, and/or network outages.

DETAILED DESCRIPTION

Figure 1:
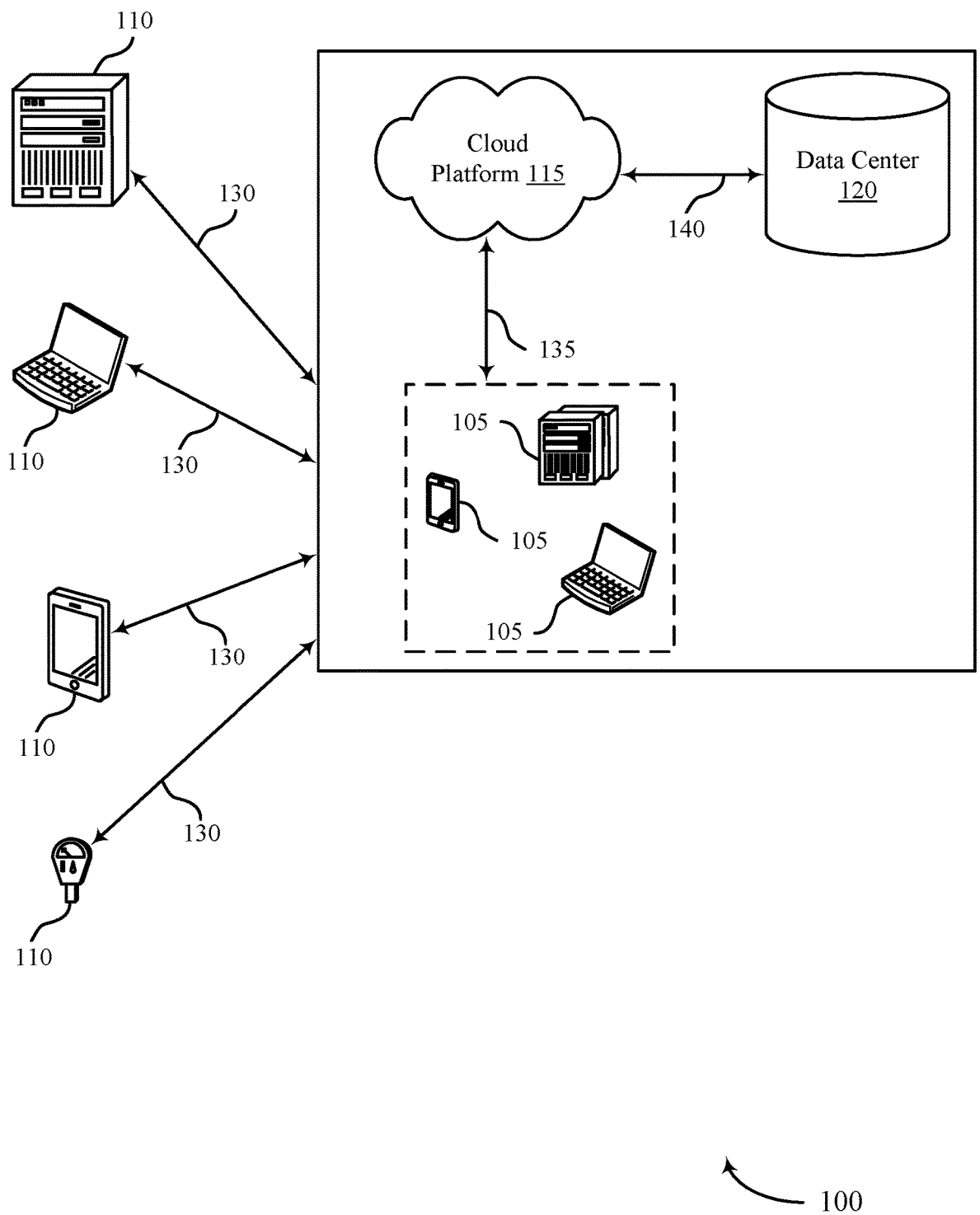
FIGS. 1 and 2 illustrate examples of computing systems that support automatically rendering and deploying network security policies in accordance with aspects of the present disclosure.

In some cloud computing systems, different organizations may use private networks that operate according to various network policies and rules. These policies may be established and enforced for security purposes, regulatory compliance purposes, and internal organization-related purposes. Network policy enforcement involves monitoring network traffic to ensure that only authorized traffic flows are allowed in and out of the network based on various rules defined by a given network policy. Network entities (such as switches, routers, and proxy servers) owned or operated by these organizations may store and use these policies to perform various actions (e.g., filter out, log, mark) on non-compliant and/or suspicious network traffic (for example, packets from an unrecognized Internet Protocol (IP) address). In some cases, however, updating or modifying network policies can be tedious, manually intensive, and error-prone.

Furthermore, existing policy enforcement schemes may be unsuitable for systems that support multi-substrate cloud services operating across different hosting environments. As described herein, a substrate refers to an underlying service infrastructure, such as a public cloud infrastructure managed by a third-party cloud service provider or a physical data center infrastructure managed by an organization. A substrate may be defined by (i.e., composed of) elements such as a data center, network, system architecture, storage component, rack provisioning, hardware configuration, or the like. A substrate forms the base layer on which all products and services in an organization can operate. Updating a security policy of a service that operates across multiple substrates may involve updating and/or modifying the network settings for each instance of the service (and, in some cases, other child objects referenced in the security policy). Conventional policy enforcement schemes may not fully account for the impact a change to one service instance will have on other service instances running in other hosting environments.

The techniques described herein support zero touch automation (ZeTA) policy-as-a-service (PaaS) functionality for multi-cloud environments. As an example, a network security engineer may create or otherwise update a network security policy via a declarative user interface. The network security policy may include policy details for a specific service instance, such as a substrate of the service instance or a policy syntax used for the service instance. Once the network security policy is created (or updated), a rendering sub-system (referred to herein as ZeTA-R) may use at least one application programming interface (API) to translate the declarative network security policy into an access control list (ACL) that can be interpreted and/or processed by a network entity (also referred to herein as a policy enforcement point (PEP) or a network node) responsible for enforcing the network security policy.

Once the network security policy is rendered (i.e., translated), the rendering sub-system may store the ACL in a data repository accessible to the network entity. Thereafter, the rendering sub-system may transmit a notification to a deployment sub-system (referred to herein as ZeTA-D) responsible for deploying/pushing the network security policy to the network entity. Accordingly, the deployment sub-system may notify the network entity that a new/updated ACL is available for deployment. Upon receiving this notification, the network entity may retrieve the ACL from the data repository and use the retrieved ACL to enforce the new/updated network security policy. As described herein, the ACL may include the IP addresses of nodes (e.g., devices, servers, or service instances) that are authorized to communicate with a given service instance. In some examples, one or both of the rendering sub-system or the deployment sub-system may generate and use a topology mapping to determine which service instances are affected by a policy change.

Aspects of the present disclosure may be implemented to realize one or more of the following advantages. The policy enforcement techniques disclosed herein may enable users of a multi-cloud (i.e., multi-substrate) computing system to create, maintain, and update network security policies with reduced manual interaction, greater reliability, and fewer errors, among other benefits. More specifically, the described techniques may support service-oriented, platform-agnostic policy rendering by enabling a computing system to automatically render and deploy policy changes to service instances running in different hosting environments, thereby decoupling services from the underlying policy implementation process. As a result, users can create, deploy, and fix network security policies without manually performing the various low-level changes associated with policy updates.

Aspects of the disclosure are initially described in the context of computing systems and process flows. Aspects of the disclosure are further illustrated by and described with reference to apparatus diagrams, system diagrams, and flowcharts that relate to techniques for automatically rendering and deploying network security policies.

FIG. 1 illustrates an example of a computing system 100 that supports automatically rendering and deploying network security policies in accordance with various aspects of the present disclosure. The computing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server, a smartphone, or a laptop. In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction 130. The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server, a laptop, a smartphone, or a sensor. In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including-but not limited to-client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

The cloud platform 115 may include cloud clients 105, servers, and data center 120. In some cases, data processing may occur at any of the components of the cloud platform 115, or at a combination of these components. In some cases, servers may perform the data processing. The servers may be managed by a cloud client 105 or located at data center 120.

The computing system 100 may be an example of a multi-tenant system. For example, the computing system 100 may store data and provide applications, solutions, or any other functionality for multiple tenants concurrently. A tenant may be an example of a group of users (e.g., an organization) associated with a same tenant identifier (ID) who share access, privileges, or both for the computing system 100. The computing system 100 may effectively separate data and processes for a first tenant from data and processes for other tenants using a system architecture, logic, or both that support secure multi-tenancy. In some examples, the computing system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the computing system 100 may run a single instance of software on a processing device (e.g., a server, server cluster, virtual machine) to serve multiple tenants. Such a multi-tenant system may provide for efficient integrations (e.g., using APIs) by applying the integrations to the same software application and underlying architectures supporting multiple tenants. In some cases, processing resources, memory resources, or both may be shared by multiple tenants.

As described herein, the computing system 100 may support any configuration for providing multi-tenant functionality. For example, the computing system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The computing system 100 may support scaling of tenants within the multi-tenant system, for example, using scale triggers, automatic scaling procedures, scaling requests, or any combination thereof. In some cases, the computing system 100 may implement one or more scaling rules to enable relatively fair sharing of resources across tenants. For example, a tenant may have a threshold quantity of processing resources, memory resources, or both to use, which in some cases may be tied to a subscription by the tenant.

In accordance with aspects of the present disclosure, the computing system 100 may receive a notification of an update to one or more network security objects hosted in diverse substrates within the computing system 100 (such as the hosting environment 305-a described with reference to FIGS. 3A and 3B). The computing system 100 may retrieve a network security policy for at least one service instance (e.g., the service instances 210 described with reference to FIG. 2) impacted by the update in any substrate. The computing system 100 may update (i.e., re-render) the network security policy for the at least one service instance according to a network security configuration of the hosting substrate. The computing system 100 may translate the updated network security policy into respective ACLs for one or more PEPs (equivalently referred to as network entities) that manage communications between nodes in the computing system 100. The computing system 100 may store the respective ACLs in data repositories that are accessible to the one or more PEPs, which may be spread across diverse substrates. The computing system 100 may transmit, to the one or more PEPs, a notification that the respective ACLs are available for deployment, thereby causing the one or more PEPs to retrieve the respective ACLs from the data repositories.

It should be appreciated by a person skilled in the art that one or more aspects of the disclosure may be implemented in a computing system to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
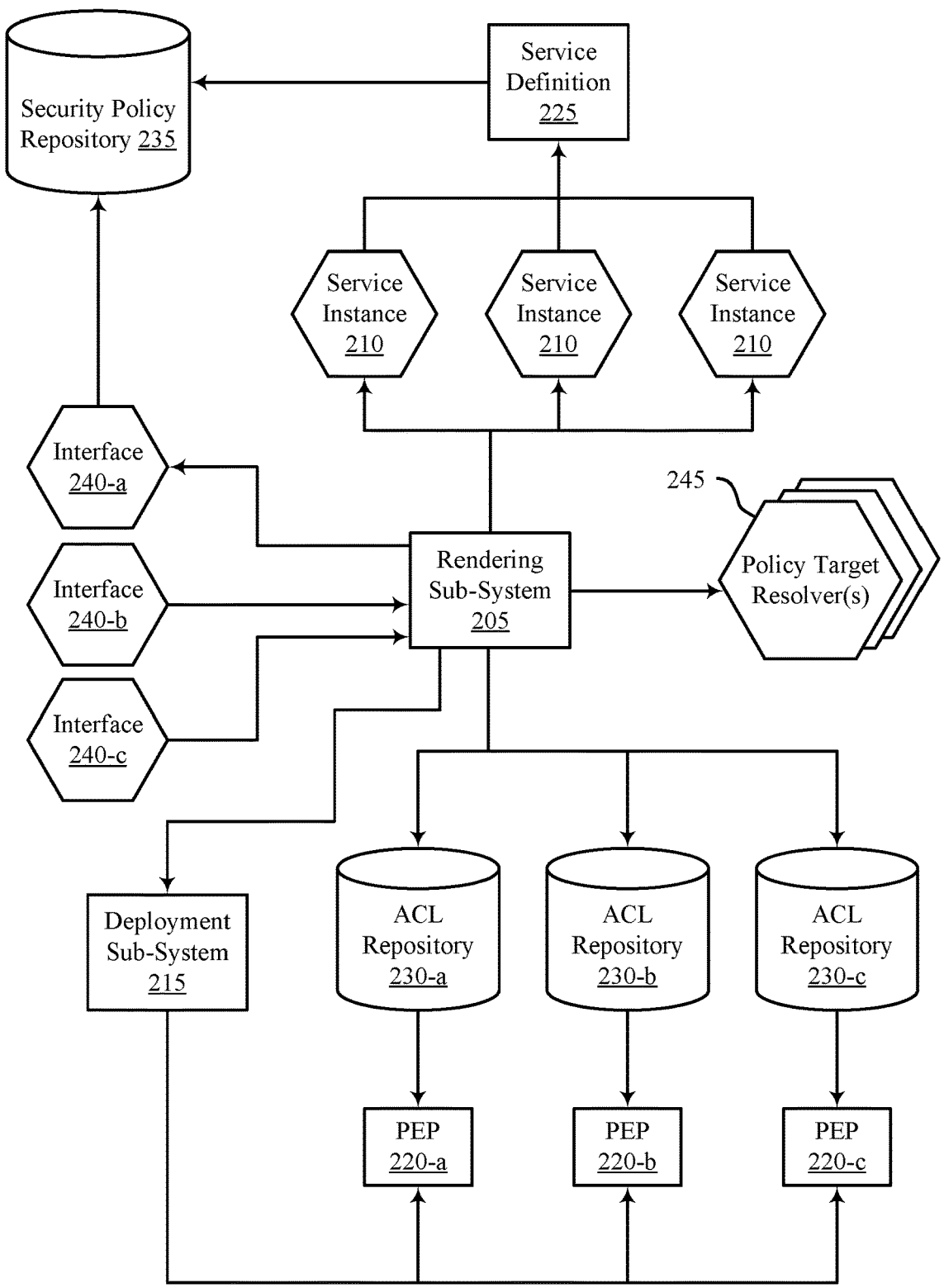

FIG. 2 illustrates an example of a computing system 200 that supports automatically rendering and deploying network security policies in accordance with aspects of the present disclosure. The computing system 200 may implement or be implemented by aspects of the computing system 100. For example, the computing system 200 includes a security policy repository 235 and ACL repositories 230, which may be examples of a data center 120 (or components thereof), as described with reference to FIG. 1. The computing system 200 also includes a rendering sub-system 205 (equivalently referred to herein as ZeTA-R) and a deployment sub-system 215 (also referred to herein as ZeTA-D), which may be implemented or otherwise supported by one or more components of the cloud platform 115, as described with reference to FIG. 1.

Service-oriented system architectures running in public cloud substrates may host services with multiple network security policies that involve diverse substrates and different low-level policy languages. The system architecture disclosed herein provides an efficient, scalable, reliable way to translate high-level security policies into low-level ACLs, decoupling services and high-level policies from low-level policy implementation in a fully automated way.

The event-based network ACL translation techniques described herein may be applicable to single-publisher, multiple-subscriber network configurations. Aspects of the present disclosure support high-level (i.e., declarative) policy languages, auto-resolution of policy conflicts, extensible low-level ACLs, backwards service/policy mapping and auto-learning, resilient ACL rendering (for example, by exposing hooks to drift detection tools to render ACLs on-demand), and auto-scaled policy solutions with high availability.

The computing system 200 may also support low-level multi-platform ACL rendering for native multi-cloud environments, providing service owners with the capability to define, for each high-level policy, how the corresponding ACLs are rendered. The high-level (i.e., declarative) policy language may include statements that identify low-level syntaxes in which a high-level policy is to be rendered.

In accordance with aspects of the present disclosure, the rendering sub-system 205 may receive (e.g., via a service change notification interface 240-c) a notification of a change to a service hosting environment (such as the hosting environment 305-a described with reference to FIGS. 3A and 3B). Additionally, or alternatively, the rendering sub-system 205 may receive (e.g., via a policy child object change notification interface 240-b) a notification of a change to a policy child object referenced in a network security policy.

In response to the notification(s), the rendering sub-system 205 may identify which service instances 210 are impacted (i.e., affected) by a service hosting environment change and/or a policy child object change. In some examples, the rendering sub-system 205 may determine which service instances 210 are impacted by a change based on a service definition 225 and/or a topology mapping (as described with reference to FIGS. 3A and 3B). As described herein, a service instance may refer to an instance of a cloud service (such as the service 310-c described with reference to FIGS. 3A and 3B) running in a particular substrate (such as the hosting environment 305-c described with reference to FIGS. 3A and 3B).

Once the rendering sub-system 205 has identified all service instances 210 affected by the update(s), the rendering sub-system 205 may pull (i.e., retrieve) the policies attached to each of the service instances 210. More specifically, the rendering sub-system 205 may use a security policy read interface 240-a to access a security policy repository 235 that includes policy information for all service instances 210. After obtaining policy information from the security policy repository 235 via the security policy read interface 240-a, the rendering sub-system 205 may use policy target resolvers 245 (e.g., policy resolving APIs) to translate high-level policy objects into low-level ACLs that can be processed by PEPs 220 (also referred to herein as network entities or network nodes). Examples of high-level policy objects include (but are not limited to) network address entities (for example, translating host names into corresponding layer 3 addresses) and network service entities (for example, translating a service name into corresponding layer 4 protocols and ports).

Accordingly, the rendering sub-system 205 may save the low-level ACLs to ACL repositories 230 (also referred to as data repositories) specified in the network security policies. For example, the rendering sub-system 205 may store a first ACL in an ACL repository 230-a that is accessible to a PEP 220-a, a second ACL in an ACL repository 230-b that is accessible to a PEP 220-b, and a third ACL in an ACL repository 230-c that is accessible to a PEP 220-c. The ACLs may include a list of valid source IP addresses and destination IP addresses, which may enable the PEPs 220 to effectively monitor and/or filter network traffic. The PEPs 220 may use the ACLs to detect and block unauthorized network traffic (for example, packets from an unrecognized IP address).

In turn, the rendering sub-system 205 may notify the deployment sub-system 215 that updated network security policies have been generated. Accordingly, the deployment sub-system 215 may notify the PEPs 220 that the updated policies are available for deployment. The PEPs 220 may then retrieve (i.e., pull) the new ACLs from the ACL repositories 230 and enforce the new/updated network security policy using the ACLs.

In some implementations, after an ACL is updated or modified, an administrator of the computing system 200 may want to revert the ACL to a previous version (i.e., a heal-me process) or keep the ACL in a current state (for example, if a low-level change was applied manually during an emergency break and fix scenario, also known as a leave-me-alone process). To effectively handle these scenarios, the computing system 200 may use a first API endpoint (i.e., a heal-me endpoint) to re-render a given ACL on-demand. Likewise, the computing system 200 may use a second API endpoint (i.e., a leave-me-alone endpoint) to disable rendering operations for a given ACL.

Figure 3A:
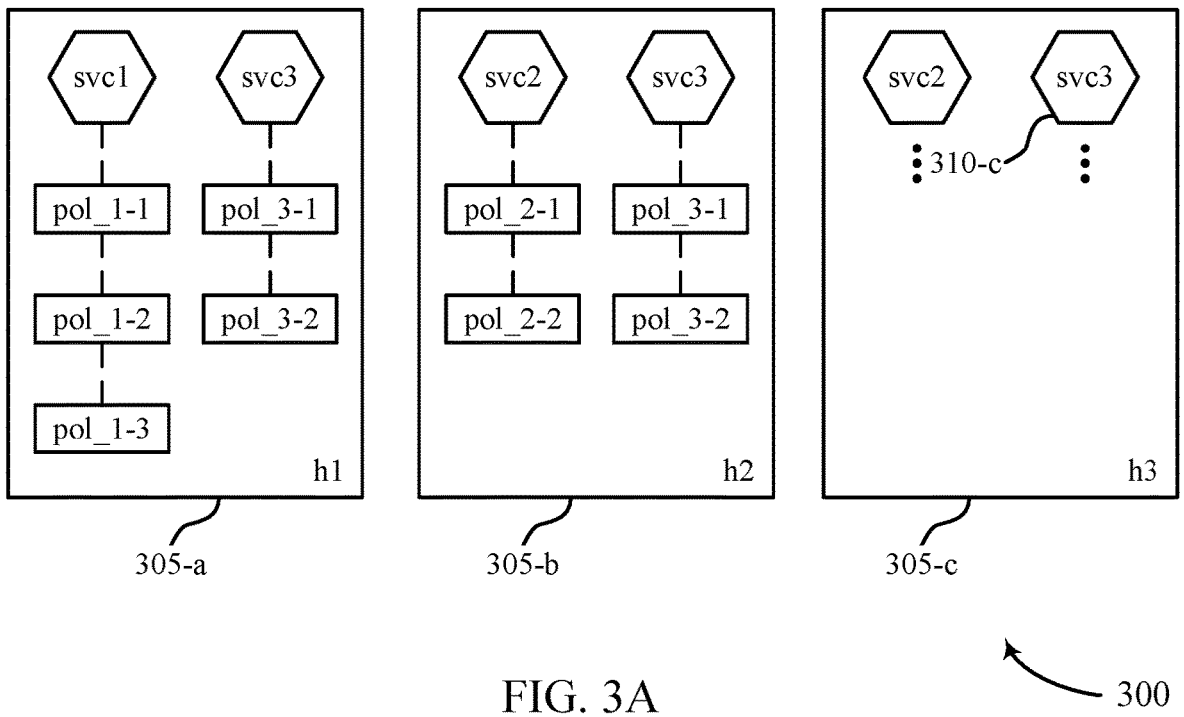
FIGS. 3A and 3B illustrate examples of system topologies that support automatically rendering and deploying network security policies in accordance with aspects of the present disclosure.
Figure 3B:
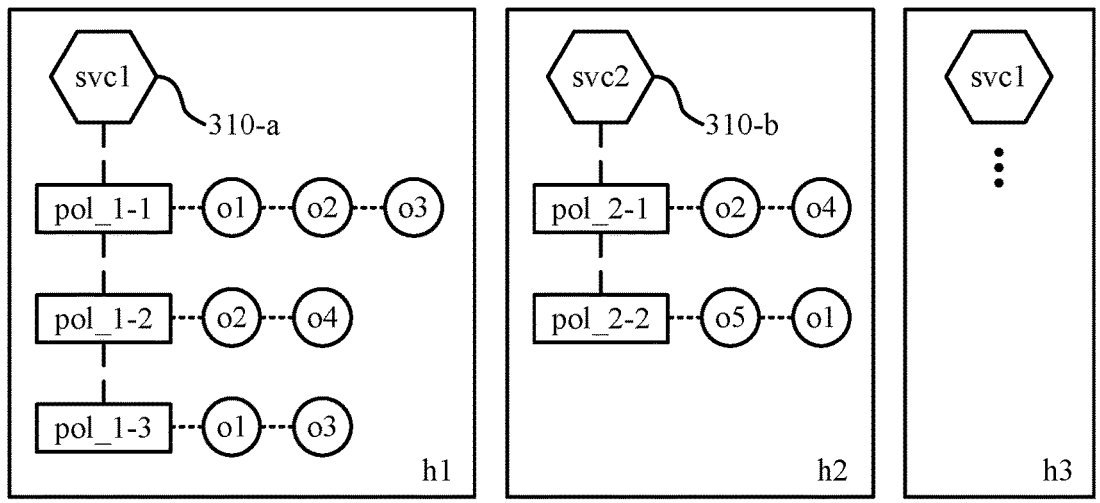

FIGS. 3A and 3B illustrate examples of a system topology 300 and a system topology 301 that support automatically rendering and deploying network security policies in accordance with aspects of the present disclosure. The system topology 300 and the system topology 301 may implement or be implemented by aspects of the computing system 100 or the computing system 200. For example, the system topology 301 includes a hosting environment 305-a (h1), a hosting environment 305-b (h2), and a hosting environment 305-c (h3), each of which may be supported or implemented by one or more aspects of the cloud platform 115, as described with reference to FIG. 1. The system topology 300 also includes a service 310-a (svc1), a service 310-b (svc2), and a service 310-c (svc3), which may be examples of the service instances 210 described with reference to FIG. 2.

As described herein, a computing system (i.e., ZeTA) may receive an indication of a change to a hosting environment (such as h2). Accordingly, the system may identify which services are impacted by the change (i.e., svc2 and svc3), and may retrieve all network security policies associated with (e.g., attached to) the impacted services. A rendering sub-system (also referred to as ZeTA-R) may then update the network security policies (if needed) and translate the updated policies into low-level ACLs that can be processed/implemented by network entities that monitor/filter communications within the system (such as the PEPs 220 described with reference to FIG. 2). In turn, ZeTA-R may store the low-level ACLs in data repositories (such as the ACL repositories 230 described with reference to FIG. 2) that are accessible to the network entities, and may notify a deployment sub-system (equivalently referred to as ZeTA-D) that the ACLs are available for deployment. Accordingly, ZeTA-D may cause the network entities to retrieve the ACLs from the data repositories and enforce the updated network security policies.

When ZeTA receives a notification of a change to a service hosting environment, ZeTA may use this information to populate/update a service topology mapping. A hosting environment may support multiple services, but this information may not be available to ZeTA. The topology mapping techniques described herein can be implemented, for example, when a change in a policy causes ZeTA to re-render all services in all hosting environments. If there is a change to a particular hosting environment, ZeTA may read/identify all services in the hosting environment and update the corresponding topology mapping(s). Each entry in the topology mapping may be associated with a time-to-live (TTL) value, after which the entry may be removed from the topology mapping.

In the example of FIG. 3A, svc1 may be associated with a first set of network security policies (pol_1-1, pol_1-2, and pol_1-3), svc2 may be associated with a second set of network security policies (pol_2-1 and pol_2-2), and svc3 may be associated with a third set of network security policies (pol_3-1 and pol_3-2). As illustrated in the system topology 300, h1 may support svc1 and svc3, h2 may support svc2 and svc3, and h3 may support svc2 and svc3. If, for example, ZeTA receives a change notification for h1, ZeTA may create a first topology mapping with the following entries: [pol_1-1: h1]; [pol_1-2: h1]; [pol_1-3: h1]; [pol_3-1: h1]; and [pol_3-2: h2]. Similarly, if ZeTA receives a change notification for h2, ZeTA may update the first topology mapping with the following entries: [pol_2-1: h2]; [pol_2-2: h2]; [pol_3-1: h1, h2]; [pol_3-2: h1, h2]. As such, if ZeTA receives a change notification for pol_3-1, ZeTA may read the entry [pol_3-1: h1, h2] and determine that policies for all services running in h1 and h2 need to be re-rendered.

ZeTA may also support backwards policy child object learning techniques for multi-cloud environments. As described herein, a hosting environment may support multiple services, where each service has one or multiple policies and each policy refers to one or multiple child objects. A policy child object change may trigger an update to all policies that refer to the child object (e.g., parent policies). To correctly implement an update to a policy child object, ZeTA may use the topology mapping techniques disclosed herein to identify all parent policies that reference the child object. Accordingly, when ZeTA receives a change notification for a hosting environment, ZeTA may use this information to populate/update a second topology mapping between parent policies and their child objects. For example, when a change occurs to h3, ZeTA may identify all services running in h3 and retrieve policy details for each service. ZeTA may use these policy details to update the second topology mapping as needed. Each entry in the second topology mapping may have an associated TTL value, after which ZeTA may remove the entry from the second topology mapping.

In the example of FIG. 3B, each of the policies associated with svc1 (pol_1-1, pol_1-2, and pol_1-3) may refer to one or more child objects. For example, pol_1-1 may reference child objects o1, o2, and o3, pol_1-2 may reference child objects o2 and o4, and pol_1-3 may reference child objects o1 and o3. Likewise, each of the policies associated with svc2 (pol_2-1 and pol_2-2) may refer to one or more child objects. For example, pol_2-1 may reference child objects o2 and o4, while pol_2-2 may reference child objects o5 and o1. Assuming that h1 supports svc1 and h2 supports svc2, if ZeTA receives a change notification for h1, ZeTA may create a second topology mapping with the following entries: [o1: pol_1-1, pol_1-3]; [o2: pol_1-1, pol_1-2]; and [o3: pol_1-1, pol_1-3].

If ZeTA receives a change notification for h3, ZeTA may update the second topology mapping with the following entries: [o1: pol_1-1, pol_1-3, pol_2-2]; [o2: pol_1-1, pol_1-2, pol_2-1]; [o4: pol_2-1]; and [o5: pol_2-2]. As such, the second topology mapping may include the following entries: [o1: pol_1-1, pol_1-3, pol_2-2]; [o2: pol_1-1, pol_1-2, pol_2-1]; [o3: pol_1-1, pol_1-3]; [o4: pol_2-1]; and [o5: pol_2-2]. Meanwhile, the first topology mapping may include the following entries: [pol_1-1: h1]; [pol_1-2: h1]; [pol_1-3: hi]; [pol_2-1: h2]; and [pol_2-2: h2]. Thus, if ZeTA receives a change notification for o2, ZeTA may read the entry [o2: pol_1-1, pol_1-2, pol_2-1] from the second topology mapping and determine that pol_1-1, pol_1-2, and pol_2-1 need to be re-rendered. Accordingly, ZeTA may read the entries [pol_1-1: h1], [pol_1-2: h1], and [pol_2-1: h2] from the first topology mapping and determine that all services running in h1 and h2 need to be re-rendered.

Figure 4:
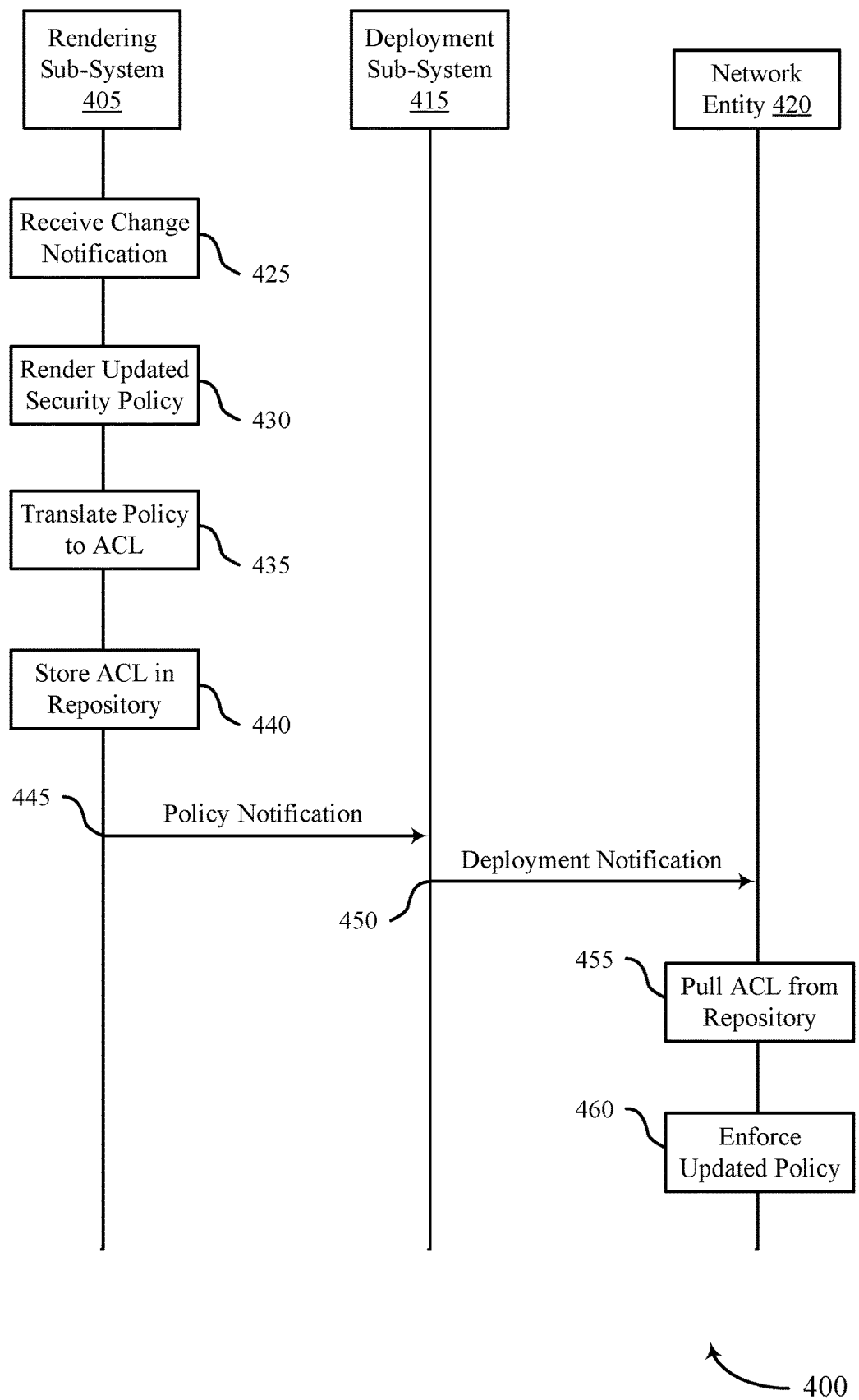
FIG. 4 illustrates an example of a process flow that supports techniques for automatically rendering and deploying network security policies in accordance with aspects of the present disclosure.

FIG. 4 illustrates an example of a process flow 400 that supports techniques for automatically rendering and deploying network security policies in accordance with aspects of the present disclosure. The process flow 400 may implement or be implemented by aspects of the computing system 100 or the computing system 200. For example, the process flow 400 includes a rendering sub-system 405 and a deployment sub-system 415, which may be an example of corresponding sub-systems described with reference to FIG. 2. The process flow 400 also includes a network entity 420, which may be an example of the PEPs 220 described with reference to FIG. 2. In the following description of the process flow 400, operations between the rendering sub-system 405, the deployment sub-system 415, and the network entity 420 may be added, omitted, or performed in a different order with respect to the exemplary order shown.

At 425, the rendering sub-system 405 (also referred to herein as ZeTA-R) may be notified of a change to a service hosting environment. Additionally, or alternatively, the rendering sub-system may receive a notification that a policy object referenced in a particular network security policy has changed. Thereafter, the rendering sub-system 405 may identify which service instances are impacted by the change, and may retrieve the policies attached to those service instances. In some implementations, the rendering sub-system 405 may use one or more topology mappings to determine which service instances and/or policy objects are affected by the policy change. For example, the rendering sub-system 405 may create a first topology mapping between service instances running in different hosting environments and/or a second topology mapping between network security policies and their policy child objects.

At 430, the rendering sub-system 405 may use one or more resolver APIs (such as the policy target resolvers 245 described with reference to FIG. 2) to render new/updated network security policies for all service instances affected by the policy change. At 435, the resolver API(s) may translate high-level policy objects from the updated policies into a low-level ACL that can be interpreted or otherwise processed by the network entity 420. As described herein, the network entity 420 may be responsible for managing communications between different nodes in the system. The low-level ACL may specify a list of valid source IP addresses, valid destination IP addresses, IP packet filtering criteria, etc.

At 440, the rendering sub-system 405 may save the ACL (i.e., a low-level policy object) to a data repository (such as the ACL repository 230-a described with reference to FIG. 2) that is accessible to the network entity 420. In some implementations, the network security policies retrieved at 425 may indicate the location (i.e., IP address, memory address) of the data repository. The network security policies may also indicate substrate information (e.g., the domain in which a service instance is running) and/or syntax information associated with the network security policies.

At 445, the rendering sub-system 405 may notify the deployment sub-system 415 that the ACL is available. At 450, the deployment sub-system 415 may notify the network entity 420 that the ACL is ready for deployment. The notification from the deployment sub-system 415 may also indicate whether the underlying policy change is a deletion, addition, modification, etc. At 455, the network entity 420 may pull (e.g., retrieve) the ACL from the data repository in response to the notification from the deployment sub-system 415. The network entity 420 may use the ACL to filter incoming and outcoming traffic in accordance with the updated network security policies.

At 460, the network entity 420 may enforce the updated security policies using the ACL retrieved from the data repository. If, for example, the updated policies result in unexpected or undesirable network behavior, a first API endpoint of the deployment sub-system 415 may revert the ACL to a previous state. Alternatively, if an engineer manually changes one or more aspects of the ACL (for example, in an emergency break and fix situation), a second API endpoint of the deployment sub-system 415 may disable all rendering processes for the ACL.

Figure 5:
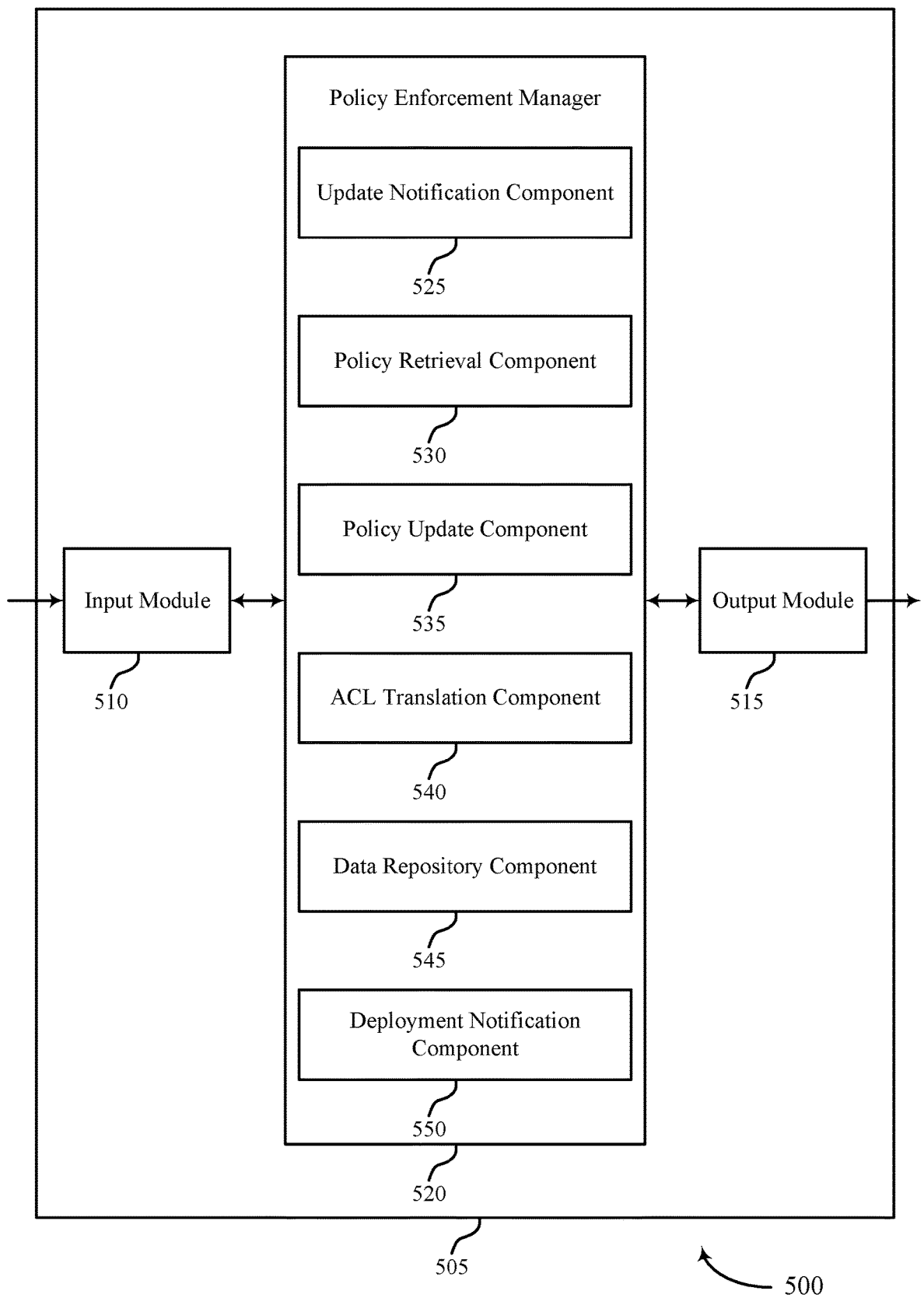
FIG. 5 illustrates a block diagram of an apparatus that supports techniques for automatically rendering and deploying network security policies in accordance with aspects of the present disclosure.

FIG. 5 illustrates a block diagram 500 of a device 505 that supports techniques for automatically rendering and deploying network security policies in accordance with aspects of the present disclosure. The device 505 may include an input module 510, an output module 515, and a policy enforcement manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the policy enforcement manager 520 to support techniques for automatically rendering and deploying network security policies. In some cases, the input module 510 may be a component of an I/O controller 710, as described with reference to FIG. 7.

The output module 515 may manage output signals for the device 505. For example, the output module 515 may receive signals from other components of the device 505, such as the policy enforcement manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710, as described with reference to FIG. 7.

For example, the policy enforcement manager 520 may include an update notification component 525, a policy retrieval component 530, a policy update component 535, an ACL translation component 540, a data repository component 545, a deployment notification component 550, or any combination thereof. In some examples, the policy enforcement manager 520, or various components thereof, may be configured to perform various operations (e.g., receiving, monitoring, transmitting) using or otherwise in cooperation with the input module 510, the output module 515, or both. For example, the policy enforcement manager 520 may receive information from the input module 510, send information to the output module 515, or be integrated in combination with the input module 510, the output module 515, or both to receive information, transmit information, or perform various other operations as described herein.

The policy enforcement manager 520 may support data processing in a computing system in accordance with examples disclosed herein. The update notification component 525 may be configured to support receiving an indication of an update to one or more network security settings of a hosting environment within the computing system. The policy retrieval component 530 may be configured to support retrieving a network security policy for at least one service instance impacted by the update. The policy update component 535 may be configured to support updating the network security policy for the at least one service instance according to the one or more network security settings of the hosting environment. The ACL translation component 540 may be configured to support translating the updated network security policy into one or more ACLs for one or more network entities managing communications between the at least one service instance and other service instances within the computing system. The data repository component 545 may be configured to support storing the one or more ACLs in respective data repositories that are accessible to the one or more network entities. The deployment notification component 550 may be configured to support transmitting, to the one or more network entities, a notification that the one or more ACLs are available for deployment, where the notification causes the one or more network entities to retrieve the one or more ACLs from the respective data repositories.

Figure 6:
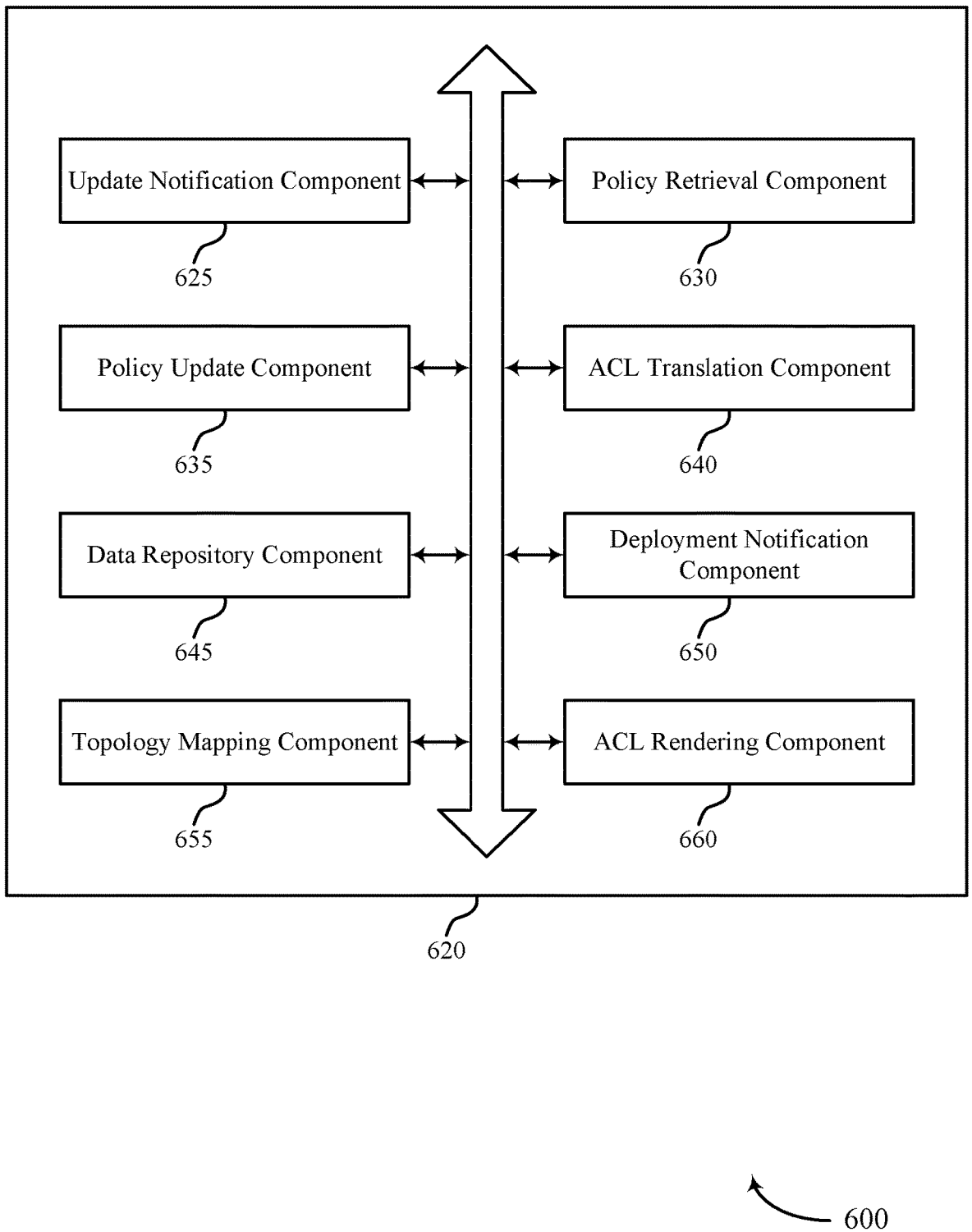
FIG. 6 illustrates a block diagram of a policy enforcement manager that supports techniques for automatically rendering and deploying network security policies in accordance with aspects of the present disclosure.

FIG. 6 illustrates a block diagram 600 of a policy enforcement manager 620 that supports techniques for automatically rendering and deploying network security policies in accordance with aspects of the present disclosure. The policy enforcement manager 620 may be an example of aspects of a policy enforcement manager or a policy enforcement manager 520, or both, as described herein. The policy enforcement manager 620, or various components thereof, may be an example of means for performing various aspects of techniques for automatically rendering and deploying network security policies as described herein. For example, the policy enforcement manager 620 may include an update notification component 625, a policy retrieval component 630, a policy update component 635, an ACL translation component 640, a data repository component 645, a deployment notification component 650, a topology mapping component 655, an ACL rendering component 660, or any combination thereof. Each of these components may communicate, directly or indirectly, with one another (e.g., via one or more buses).

The policy enforcement manager 620 may support data processing in a computing system in accordance with examples disclosed herein. The update notification component 625 may be configured to support receiving an indication of an update to one or more network security settings of a hosting environment within the computing system. The policy retrieval component 630 may be configured to support retrieving a network security policy for at least one service instance impacted by the update. The policy update component 635 may be configured to support updating the network security policy for the at least one service instance according to the one or more network security settings of the hosting environment. The ACL translation component 640 may be configured to support translating the updated network security policy into one or more ACLs for one or more network entities managing communications between the at least one service instance and other service instances within the computing system. The data repository component 645 may be configured to support storing the one or more ACLs in respective data repositories that are accessible to the one or more network entities. The deployment notification component 650 may be configured to support transmitting, to the one or more network entities, a notification that the one or more ACLs are available for deployment, where the notification causes the one or more network entities to retrieve the one or more ACLs from the respective data repositories.

In some examples, the update notification component 625 may be configured to support receiving an indication of a change to a policy child object referred to in the network security policy of the at least one service instance running in the hosting environment, where updating the network security policy is based on the change to the policy child object.

In some examples, to support retrieving the network security policy for the at least one service instance, the policy retrieval component 630 may be configured to support retrieving a list of all service instances and corresponding network security policies that are impacted by the update to the one or more network security settings of the hosting environment.

In some examples, the topology mapping component 655 may be configured to support generating a first topology mapping between locations of different service instances within the computing system. In some examples, the topology mapping component 655 may be configured to support generating a second topology mapping between policy child objects and network security policies that refer to the policy child objects.

In some examples, the topology mapping component 655 may be configured to support determining that a policy child object referred to in the network security policy of the at least one service instance is impacted by the update to the one or more network security settings of the hosting environment based on the first topology mapping and the second topology mapping. In some examples, entries are removed from the first topology mapping and the second topology mapping after TTL parameters associated with the entries have expired.

In some examples, to support transmitting the notification, the deployment notification component 650 may be configured to support transmitting, to the one or more network entities, an indication of whether the update is a deletion, an addition, or a modification of network security settings associated with the hosting environment.

In some examples, the ACL rendering component 660 may be configured to support reverting the one or more ACLs to a previous version if an updated version of the one or more ACLs causes an error.

In some examples, the ACL rendering component 660 may be configured to support disabling all rendering operations associated with the one or more ACLs for a time period after modifying the one or more ACLs.

In some examples, a rendering sub-system of the computing system uses an API to translate the network security policy from a high-level policy language to a low-level syntax that is compatible with the one or more network entities.

In some examples, the one or more ACLs include IP addresses that are authorized to communicate with the at least one service instance running in the hosting environment. In some examples, the at least one service instance corresponds to a multi-substrate network security service operating across a set of multiple hosting environments.

In some examples, the hosting environment includes a cloud computing environment managed by a multi-tenant database system or a third-party cloud service provider. In some examples, the one or more ACLs are used to filter incoming traffic to the at least one service instance and outgoing traffic from the at least one service instance. In some examples, the network security policy indicates locations of the respective data repositories to which the one or more ACLs are stored.

In some examples, the computing system includes a rendering sub-system that generates the one or more ACLs and a deployment sub-system that pushes the one or more ACLs to the one or more network entities. In some examples, the network security policy indicates a substrate of the at least one service instance and a syntax of the network security policy.

Figure 7:
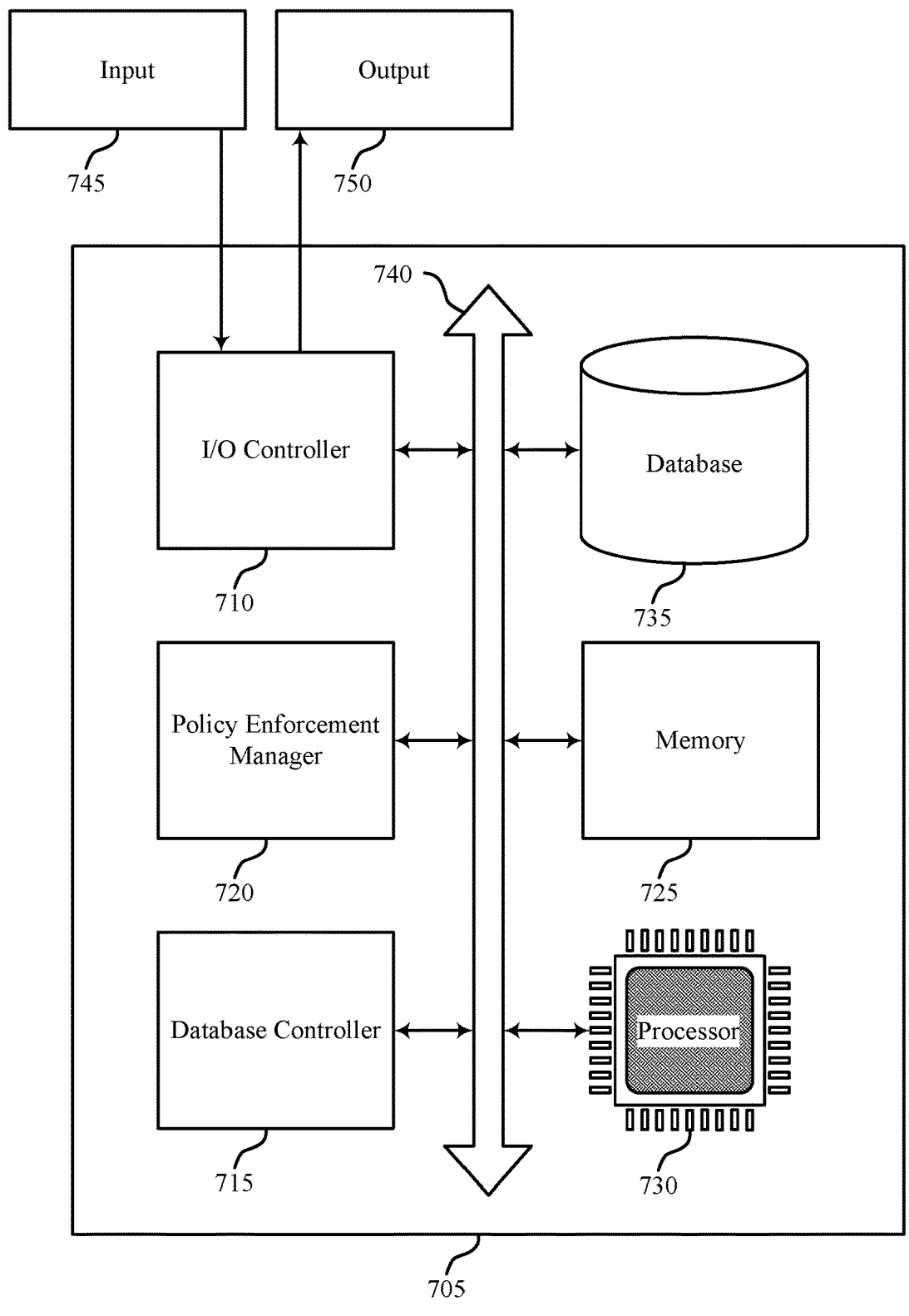
FIG. 7 illustrates a diagram of a system including a device that supports techniques for automatically rendering and deploying network security policies in accordance with aspects of the present disclosure.

FIG. 7 illustrates a diagram of a system 700 including a device 705 that supports techniques for automatically rendering and deploying network security policies in accordance with aspects of the present disclosure. The device 705 may be an example of or include the components of a device 505, as described herein. The device 705 may include components for data communications, including components for transmitting and receiving communications, such as a policy enforcement manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for automatically rendering and deploying network security policies).

The policy enforcement manager 720 may support data processing in a computing system in accordance with examples disclosed herein. For example, the policy enforcement manager 720 may be configured to support receiving an indication of an update to one or more network security settings of a hosting environment within the computing system. The policy enforcement manager 720 may be configured to support retrieving a network security policy for at least one service instance impacted by the update. The policy enforcement manager 720 may be configured to support updating the network security policy for the at least one service instance according to the one or more network security settings of the hosting environment. The policy enforcement manager 720 may be configured to support translating the updated network security policy into one or more ACLs for one or more network entities managing communications between the at least one service instance and other service instances within the computing system. The policy enforcement manager 720 may be configured to support storing the one or more ACLs in respective data repositories that are accessible to the one or more network entities. The policy enforcement manager 720 may be configured to support transmitting, to the one or more network entities, a notification that the one or more ACLs are available for deployment, where the notification causes the one or more network entities to retrieve the one or more ACLs from the respective data repositories.

By including or configuring the policy enforcement manager 720 in accordance with examples as described herein, the device 705 may enable users of a multi-cloud (i.e., multi-substrate) computing system (such as the system 700) to create, maintain, and update network security policies with reduced manual interaction, greater reliability, and fewer errors, among other benefits. More specifically, the described techniques may support service-oriented, platform-agnostic policy rendering by enabling the system 700 to automatically render and deploy policy changes to service instances running in different hosting environments, thereby decoupling services from the underlying policy implementation process. As a result, users can create, deploy, and fix network security policies without manually performing the various low-level changes associated with policy updates.

Figure 8:
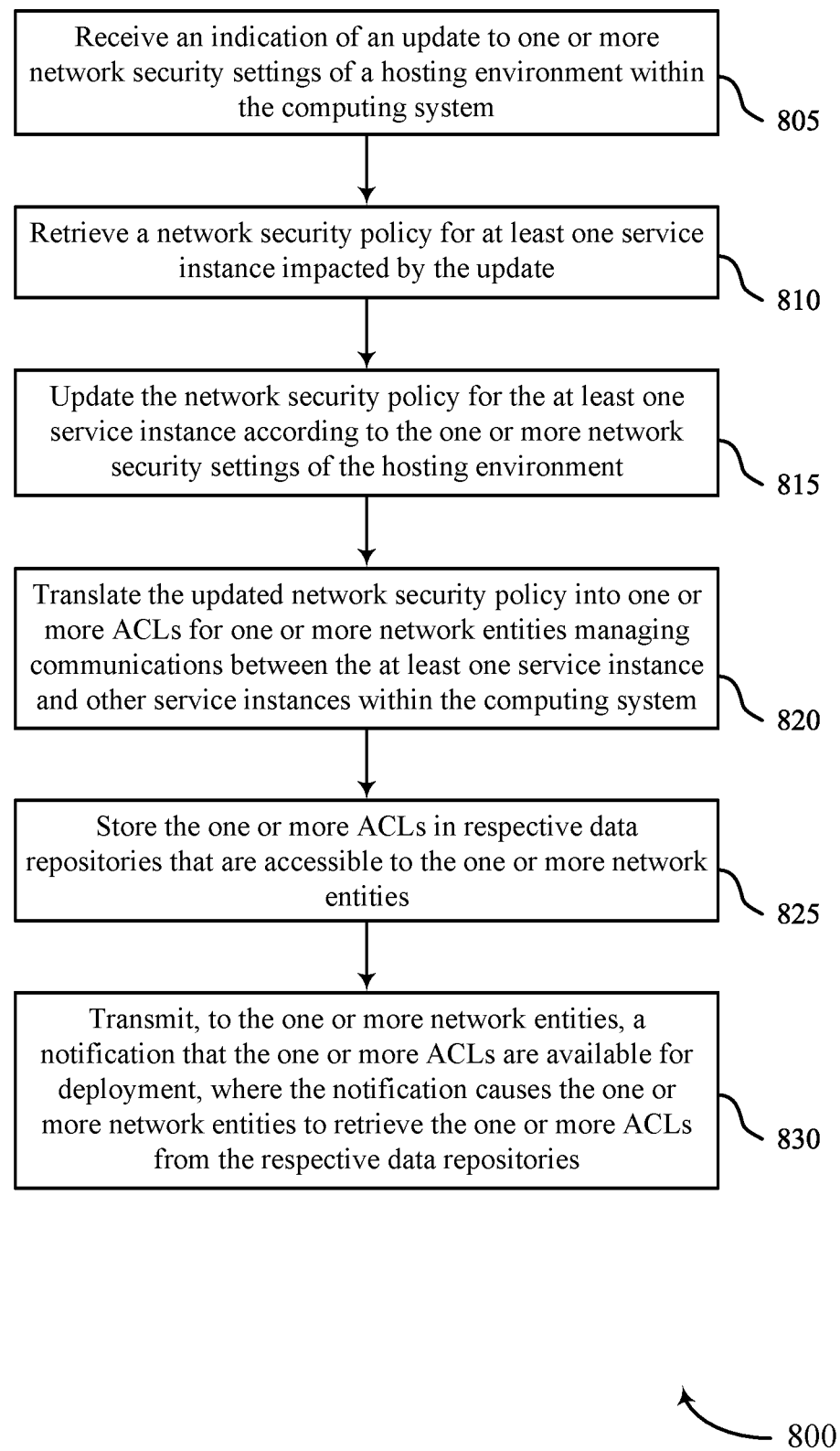
FIGS. 8 and 9 illustrate flowcharts showing methods that support techniques for automatically rendering and deploying network security policies in accordance with aspects of the present disclosure.

FIG. 8 illustrates a flowchart showing a method 800 that supports automatically rendering and deploying network security policies in accordance with aspects of the present disclosure. The operations of the method 800 may be implemented by a computing system or components thereof. For example, the operations of the method 800 may be performed by aspects of the computing system 200, as described with reference to FIG. 2. In some examples, the computing system may execute a set of instructions to control the functional elements of the computing system to perform the described functions. Additionally, or alternatively, the computing system may perform aspects of the described functions using special-purpose hardware.

At 805, the computing system may receive an indication of an update to one or more network security settings of a hosting environment within the computing system. The operations of 805 may be performed in accordance with examples disclosed herein. In some examples, aspects of the operations of 805 may be performed by an update notification component 625, as described with reference to FIG. 6.

At 810, the computing system may retrieve a network security policy for at least one service instance impacted by the update. The operations of 810 may be performed in accordance with examples disclosed herein. In some examples, aspects of the operations of 810 may be performed by a policy retrieval component 630, as described with reference to FIG. 6.

At 815, the computing system may update the network security policy for the at least one service instance according to the one or more network security settings of the hosting environment. The operations of 815 may be performed in accordance with examples disclosed herein. In some examples, aspects of the operations of 815 may be performed by a policy update component 635, as described with reference to FIG. 6.

At 820, the computing system may translate the updated network security policy into one or more ACLs for one or more network entities managing communications between the at least one service instance and other service instances within the computing system. The operations of 820 may be performed in accordance with examples disclosed herein. In some examples, aspects of the operations of 820 may be performed by an ACL translation component 640, as described with reference to FIG. 6.

At 825, the computing system may store the one or more ACLs in respective data repositories that are accessible to the one or more network entities. The operations of 825 may be performed in accordance with examples disclosed herein. In some examples, aspects of the operations of 825 may be performed by a data repository component 645, as described with reference to FIG. 6.

At 830, the computing system may transmit, to the one or more network entities, a notification that the one or more ACLs are available for deployment, where the notification causes the one or more network entities to retrieve the one or more ACLs from the respective data repositories. The operations of 830 may be performed in accordance with examples disclosed herein. In some examples, aspects of the operations of 830 may be performed by a deployment notification component 650, as described with reference to FIG. 6.

Figure 9:
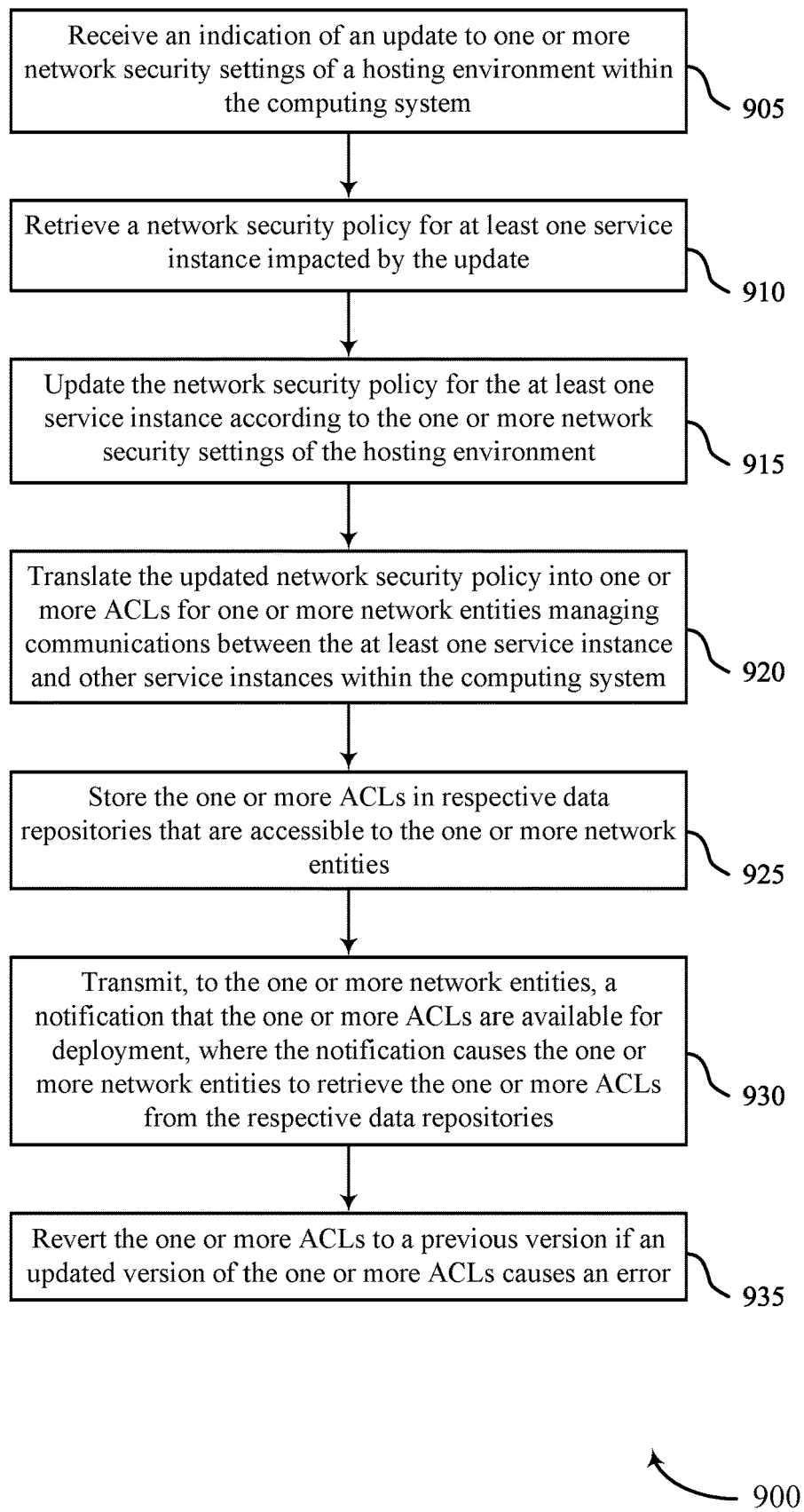

FIG. 9 illustrates a flowchart showing a method 900 that supports automatically rendering and deploying network security policies in accordance with aspects of the present disclosure. The operations of the method 900 may be implemented by a computing system or components thereof. For example, the operations of the method 900 may be performed by aspects of the computing system 200, as described with reference to FIG. 2. In some examples, the computing system may execute a set of instructions to control the functional elements of the computing system to perform the described functions. Additionally, or alternatively, the computing system may perform aspects of the described functions using special-purpose hardware.

At 905, the computing system may receive an indication of an update to one or more network security settings of a hosting environment within the computing system. The operations of 905 may be performed in accordance with examples disclosed herein. In some examples, aspects of the operations of 905 may be performed by an update notification component 625, as described with reference to FIG. 6.

At 910, the computing system may retrieve a network security policy for at least one service instance impacted by the update. The operations of 910 may be performed in accordance with examples disclosed herein. In some examples, aspects of the operations of 910 may be performed by a policy retrieval component 630, as described with reference to FIG. 6.

At 915, the computing system may update the network security policy for the at least one service instance according to the one or more network security settings of the hosting environment. The operations of 915 may be performed in accordance with examples disclosed herein. In some examples, aspects of the operations of 915 may be performed by a policy update component 635, as described with reference to FIG. 6.

At 920, the computing system may translate the updated network security policy into one or more ACLs for one or more network entities managing communications between the at least one service instance and other service instances within the computing system. The operations of 920 may be performed in accordance with examples disclosed herein. In some examples, aspects of the operations of 920 may be performed by an ACL translation component 640, as described with reference to FIG. 6.

At 925, the computing system may store the one or more ACLs in respective data repositories that are accessible to the one or more network entities. The operations of 925 may be performed in accordance with examples disclosed herein. In some examples, aspects of the operations of 925 may be performed by a data repository component 645, as described with reference to FIG. 6.

At 930, the computing system may transmit, to the one or more network entities, a notification that the one or more ACLs are available for deployment, where the notification causes the one or more network entities to retrieve the one or more ACLs from the respective data repositories. The operations of 930 may be performed in accordance with examples disclosed herein. In some examples, aspects of the operations of 930 may be performed by a deployment notification component 650, as described with reference to FIG. 6.

At 935, the computing system may revert the one or more ACLs to a previous version if an updated version of the one or more ACLs causes an error. The operations of 935 may be performed in accordance with examples disclosed herein. In some examples, aspects of the operations of 935 may be performed by an ACL rendering component 660, as described with reference to FIG. 6.

A method for data processing in a computing system is described. The method may include receiving an indication of an update to one or more network security settings of a hosting environment within the computing system. The method may further include retrieving a network security policy for at least one service instance impacted by the update. The method may further include updating the network security policy for the at least one service instance according to the one or more network security settings of the hosting environment. The method may further include translating the updated network security policy into one or more ACLs for one or more network entities managing communications between the at least one service instance and other service instances within the computing system. The method may further include storing the one or more ACLs in respective data repositories that are accessible to the one or more network entities. The method may further include transmitting, to the one or more network entities, a notification that the one or more ACLs are available for deployment, where the notification causes the one or more network entities to retrieve the one or more ACLs from the respective data repositories.

An apparatus for data processing in a computing system is described. The apparatus may include a processor, memory coupled with the processor, and instructions stored in the memory. The instructions may be executable by the processor to cause the apparatus to receive an indication of an update to one or more network security settings of a hosting environment within the computing system. The instructions may be further executable by the processor to cause the apparatus to retrieve a network security policy for at least one service instance impacted by the update. The instructions may be further executable by the processor to cause the apparatus to update the network security policy for the at least one service instance according to the one or more network security settings of the hosting environment. The instructions may be further executable by the processor to cause the apparatus to translate the updated network security policy into one or more ACLs for one or more network entities managing communications between the at least one service instance and other service instances within the computing system. The instructions may be further executable by the processor to cause the apparatus to store the one or more ACLs in respective data repositories that are accessible to the one or more network entities. The instructions may be further executable by the processor to cause the apparatus to transmit, to the one or more network entities, a notification that the one or more ACLs are available for deployment, where the notification causes the one or more network entities to retrieve the one or more ACLs from the respective data repositories.

Another apparatus for data processing in a computing system is described. The apparatus may include means for receiving an indication of an update to one or more network security settings of a hosting environment within the computing system. The apparatus may further include means for retrieving a network security policy for at least one service instance impacted by the update. The apparatus may further include means for updating the network security policy for the at least one service instance according to the one or more network security settings of the hosting environment. The apparatus may further include means for translating the updated network security policy into one or more ACLs for one or more network entities managing communications between the at least one service instance and other service instances within the computing system. The apparatus may further include means for storing the one or more ACLs in respective data repositories that are accessible to the one or more network entities. The apparatus may further include means for transmitting, to the one or more network entities, a notification that the one or more ACLs are available for deployment, where the notification causes the one or more network entities to retrieve the one or more ACLs from the respective data repositories.

A non-transitory computer-readable medium storing code for data processing in a computing system is described. The code may include instructions executable by a processor to receive an indication of an update to one or more network security settings of a hosting environment within the computing system. The instructions may be further executable by the processor to retrieve a network security policy for at least one service instance impacted by the update. The instructions may be further executable by the processor to update the network security policy for the at least one service instance according to the one or more network security settings of the hosting environment. The instructions may be further executable by the processor to translate the updated network security policy into one or more ACLs for one or more network entities managing communications between the at least one service instance and other service instances within the computing system. The instructions may be further executable by the processor to store the one or more ACLs in respective data repositories that are accessible to the one or more network entities. The instructions may be further executable by the processor to transmit, to the one or more network entities, a notification that the one or more ACLs are available for deployment, where the notification causes the one or more network entities to retrieve the one or more ACLs from the respective data repositories.

Some examples of the methods, apparatuses, and non-transitory computer-readable media described herein may further include operations, features, means, or instructions for receiving an indication of a change to a policy child object referred to in the network security policy of the at least one service instance running in the hosting environment, where updating the network security policy is based on the change to the policy child object.

In some examples of the methods, apparatuses, and non-transitory computer-readable media described herein, retrieving the network security policy for the at least one service instance may include operations, features, means, or instructions for retrieving a list of all service instances and corresponding network security policies that are impacted by the update to the one or more network security settings of the hosting environment.

Some examples of the methods, apparatuses, and non-transitory computer-readable media described herein may further include operations, features, means, or instructions for generating a first topology mapping between locations of different service instances within the computing system and a second topology mapping between policy child objects and network security policies that refer to the policy child objects.

Some examples of the methods, apparatuses, and non-transitory computer-readable media described herein may further include operations, features, means, or instructions for determining that a policy child object referred to in the network security policy of the at least one service instance is impacted by the update to the one or more network security settings of the hosting environment based on the first topology mapping and the second topology mapping.

In some examples of the methods, apparatuses, and non-transitory computer-readable media described herein, entries may be removed from the first topology mapping and the second topology mapping after TTL parameters associated with the entries may have expired.

In some examples of the methods, apparatuses, and non-transitory computer-readable media described herein, transmitting the notification may include operations, features, means, or instructions for transmitting, to the one or more network entities, an indication of whether the update is a deletion, an addition, or a modification of network security settings associated with the hosting environment.

Some examples of the methods, apparatuses, and non-transitory computer-readable media described herein may further include operations, features, means, or instructions for reverting the one or more ACLs to a previous version if an updated version of the one or more ACLs causes an error.

Some examples of the methods, apparatuses, and non-transitory computer-readable media described herein may further include operations, features, means, or instructions for disabling all rendering operations associated with the one or more ACLs for a time period after modifying the one or more ACLs.

In some examples of the methods, apparatuses, and non-transitory computer-readable media described herein, a rendering sub-system of the computing system uses an API to translate the network security policy from a high-level policy language to a low-level syntax that is compatible with the one or more network entities.

In some examples of the methods, apparatuses, and non-transitory computer-readable media described herein, the one or more ACLs may include IP addresses that are authorized to communicate with the at least one service instance running in the hosting environment.

In some examples of the methods, apparatuses, and non-transitory computer-readable media described herein, the at least one service instance corresponds to a multi-substrate network security service operating across a set of multiple hosting environments.

In some examples of the methods, apparatuses, and non-transitory computer-readable media described herein, the hosting environment includes a cloud computing environment managed by a multi-tenant database system or a third-party cloud service provider.

In some examples of the methods, apparatuses, and non-transitory computer-readable media described herein, the one or more ACLs may be used to filter incoming traffic to the at least one service instance and outgoing traffic from the at least one service instance.

In some examples of the methods, apparatuses, and non-transitory computer-readable media described herein, the network security policy indicates locations of the respective data repositories to which the one or more ACLs are stored.

In some examples of the methods, apparatuses, and non-transitory computer-readable media described herein, the computing system includes a rendering sub-system that generates the one or more ACLs and a deployment sub-system that pushes the one or more ACLs to the one or more network entities.

In some examples of the methods, apparatuses, and non-transitory computer-readable media described herein, the network security policy indicates a substrate of the at least one service instance and a syntax of the network security policy.

The following provides an overview of aspects of the present disclosure:

Aspect 1: A method for data processing in a computing system, comprising: receiving an indication of an update to one or more network security settings of a hosting environment within the computing system; retrieving a network security policy for at least one service instance impacted by the update; updating the network security policy for the at least one service instance according to the one or more network security settings of the hosting environment; translating the updated network security policy into one or more ACLs for one or more network entities managing communications between the at least one service instance and other service instances within the computing system; storing the one or more ACLs in respective data repositories that are accessible to the one or more network entities; and transmitting, to the one or more network entities, a notification that the one or more ACLs are available for deployment, wherein the notification causes the one or more network entities to retrieve the one or more ACLs from the respective data repositories.

Aspect 2: The method of aspect 1, further comprising: receiving an indication of a change to a policy child object referred to in the network security policy of the at least one service instance running in the hosting environment, wherein updating the network security policy is based at least in part on the change to the policy child object.

Aspect 3: The method of any of aspects 1 through 2, wherein retrieving the network security policy for the at least one service instance comprises: retrieving a list of all service instances and corresponding network security policies that are impacted by the update to the one or more network security settings of the hosting environment.

Aspect 4: The method of any of aspects 1 through 3, further comprising: generating a first topology mapping between locations of different service instances within the computing system; generating a second topology mapping between policy child objects and network security policies that refer to the policy child objects; and determining that a policy child object referred to in the network security policy of the at least one service instance is impacted by the update to the one or more network security settings of the hosting environment based at least in part on the first topology mapping and the second topology mapping.

Aspect 5: The method of aspect 4, wherein entries are removed from the first topology mapping and the second topology mapping after TTL parameters associated with the entries have expired.

Aspect 6: The method of any of aspects 1 through 5, wherein transmitting the notification comprises: transmitting, to the one or more network entities, an indication of whether the update is a deletion, an addition, or a modification of network security settings associated with the hosting environment.

Aspect 7: The method of any of aspects 1 through 6, further comprising: reverting the one or more ACLs to a previous version if an updated version of the one or more ACLs causes an error.

Aspect 8: The method of any of aspects 1 through 6, further comprising: disabling all rendering operations associated with the one or more ACLs for a time period after modifying the one or more ACLs.

Aspect 9: The method of any of aspects 1 through 8, wherein a rendering sub-system of the computing system uses an API to translate the network security policy from a high-level policy language to a low-level syntax that is compatible with the one or more network entities.

Aspect 10: The method of any of aspects 1 through 9, wherein the one or more ACLs comprise IP addresses that are authorized to communicate with the at least one service instance running in the hosting environment.

Aspect 11: The method of any of aspects 1 through 10, wherein the at least one service instance corresponds to a multi-substrate network security service operating across a plurality of hosting environments.

Aspect 12: The method of any of aspects 1 through 11, wherein the hosting environment comprises a cloud computing environment managed by a multi-tenant database system or a third-party cloud service provider.

Aspect 13: The method of any of aspects 1 through 12, wherein the one or more ACLs are used to filter incoming traffic to the at least one service instance and outgoing traffic from the at least one service instance.

Aspect 14: The method of any of aspects 1 through 13, wherein the network security policy indicates locations of the respective data repositories to which the one or more ACLs are stored.

Aspect 15: The method of any of aspects 1 through 14, wherein the computing system comprises a rendering sub-system that generates the one or more ACLs and a deployment sub-system that pushes the one or more ACLs to the one or more network entities.

Aspect 16: The method of any of aspects 1 through 15, wherein the network security policy indicates a substrate of the at least one service instance and a syntax of the network security policy.

Aspect 17: An apparatus for data processing in a computing system, comprising: a processor; memory coupled with the processor; and instructions stored in the memory and executable by the processor to cause the apparatus to perform a method of any of aspects 1 through 16.

Aspect 18: An apparatus for data processing in a computing system, comprising at least one means for performing a method of any of aspects 1 through 16.

Aspect 19: A non-transitory computer-readable medium storing code for data processing in a computing system, the code comprising instructions executable by a processor to perform a method of any of aspects 1 through 16.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for data processing in a computing system, comprising:
    a processor;
    memory coupled with the processor; and
    instructions stored in the memory and executable by the processor to cause the apparatus to:
        receive an indication of an update to one or more network security settings of a hosting environment within the computing system;
        retrieve a network security policy for at least one service instance impacted by the update;
        update the network security policy for the at least one service instance according to the one or more network security settings of the hosting environment;
        translate the updated network security policy into one or more access control lists for one or more network entities managing communications between the at least one service instance and other service instances within the computing system;
        store the one or more access control lists in respective data repositories that are accessible to the one or more network entities; and
        transmit, to the one or more network entities, a notification that the one or more access control lists are available for deployment, wherein the notification causes the one or more network entities to retrieve the one or more access control lists from the respective data repositories.

2. The apparatus of claim 1, wherein the instructions are further executable by the processor to cause the apparatus to:
    receive an indication of a change to a policy child object referred to in the network security policy of the at least one service instance running in the hosting environment, wherein updating the network security policy is based at least in part on the change to the policy child object.

3. The apparatus of claim 1, wherein, to retrieve the network security policy for the at least one service instance, the instructions are executable by the processor to cause the apparatus to:
    retrieve a list of all service instances and corresponding network security policies that are impacted by the update to the one or more network security settings of the hosting environment.

4. The apparatus of claim 1, wherein the instructions are further executable by the processor to cause the apparatus to:
    generate a first topology mapping between locations of different service instances within the computing system;
    generate a second topology mapping between policy child objects and network security policies that refer to the policy child objects; and
    determine that a policy child object referred to in the network security policy of the at least one service instance is impacted by the update to the one or more network security settings of the hosting environment based at least in part on the first topology mapping and the second topology mapping.

5. The apparatus of claim 4, wherein entries are removed from the first topology mapping and the second topology mapping after time-to-live (TTL) parameters associated with the entries have expired.

6. The apparatus of claim 1, wherein, to transmit the notification, the instructions are executable by the processor to cause the apparatus to:
    transmit, to the one or more network entities, an indication of whether the update is a deletion, an addition, or a modification of network security settings associated with the hosting environment.

7. The apparatus of claim 1, wherein the instructions are further executable by the processor to cause the apparatus to:
    revert the one or more access control lists to a previous version if an updated version of the one or more access control lists causes an error.

8. The apparatus of claim 1, wherein the instructions are further executable by the processor to cause the apparatus to:
    disable all rendering operations associated with the one or more access control lists for a time period after modifying the one or more access control lists.

9. The apparatus of claim 1, wherein a rendering subsystem of the computing system uses an application programming interface to translate the network security policy from a high-level policy language to a low-level syntax that is compatible with the one or more network entities.

10. The apparatus of claim 1, wherein the one or more access control lists comprise Internet Protocol (IP) addresses that are authorized to communicate with the at least one service instance running in the hosting environment.

11. The apparatus of claim 1, wherein the at least one service instance corresponds to a multi-substrate network security service operating across a plurality of hosting environments.

12. The apparatus of claim 1, wherein the hosting environment comprises a cloud computing environment managed by a multi-tenant database system or a third-party cloud service provider.

13. The apparatus of claim 1, wherein the one or more access control lists are used to filter incoming traffic to the at least one service instance and outgoing traffic from the at least one service instance.

14. The apparatus of claim 1, wherein the network security policy indicates locations of the respective data repositories to which the one or more access control lists are stored.

15. The apparatus of claim 1, wherein the computing system comprises a rendering sub-system that generates the one or more access control lists and a deployment sub-system that pushes the one or more access control lists to the one or more network entities.

16. The apparatus of claim 1, wherein the network security policy indicates a substrate of the at least one service instance and a syntax of the network security policy.

17. A method for data processing in a computing system, comprising:
    receiving an indication of an update to one or more network security settings of a hosting environment within the computing system;
    retrieving a network security policy for at least one service instance impacted by the update;
    updating the network security policy for the at least one service instance according to the one or more network security settings of the hosting environment;
    translating the updated network security policy into one or more access control lists for one or more network entities managing communications between the at least one service instance and other service instances within the computing system;
    storing the one or more access control lists in respective data repositories that are accessible to the one or more network entities; and
    transmitting, to the one or more network entities, a notification that the one or more access control lists are available for deployment, wherein the notification causes the one or more network entities to retrieve the one or more access control lists from the respective data repositories.

18. The method of claim 17, further comprising:
    receiving an indication of a change to a policy child object referred to in the network security policy of the at least one service instance running in the hosting environment, wherein updating the network security policy is based at least in part on the change to the policy child object.

19. The method of claim 17, wherein retrieving the network security policy for the at least one service instance comprises:
    retrieving a list of all service instances and corresponding network security policies that are impacted by the update to the one or more network security settings of the hosting environment.

20. A non-transitory computer-readable medium storing code for data processing in a computing system, the code comprising instructions executable by a processor to:
    receive an indication of an update to one or more network security settings of a hosting environment within the computing system;
    retrieve a network security policy for at least one service instance impacted by the update;
    update the network security policy for the at least one service instance according to the one or more network security settings of the hosting environment;
    translate the updated network security policy into one or more access control lists for one or more network entities managing communications between the at least one service instance and other service instances within the computing system;
    store the one or more access control lists in respective data repositories that are accessible to the one or more network entities; and
    transmit, to the one or more network entities, a notification that the one or more access control lists are available for deployment, wherein the notification causes the one or more network entities to retrieve the one or more access control lists from the respective data repositories.

* * * * *